Jan. 11, 1938. W. A. BERG 2,105,210
WAREHOUSE TRUCK
Filed Jan. 31, 1936 2 Sheets-Sheet 1
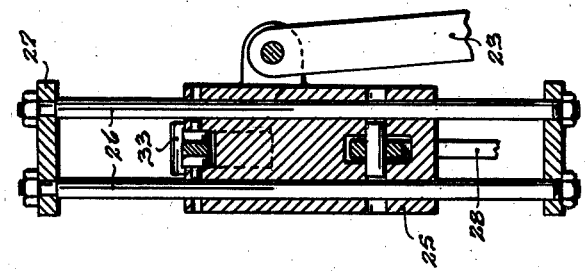
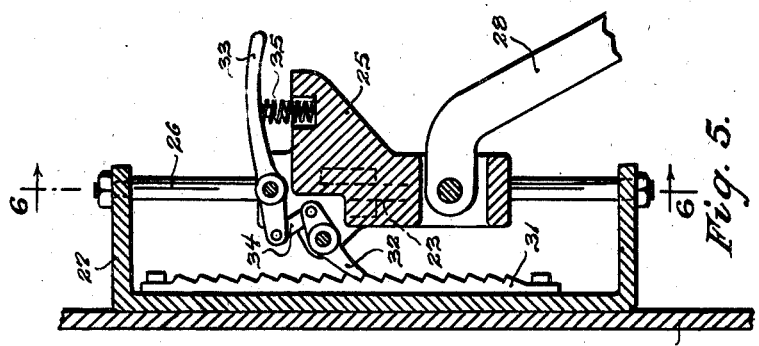
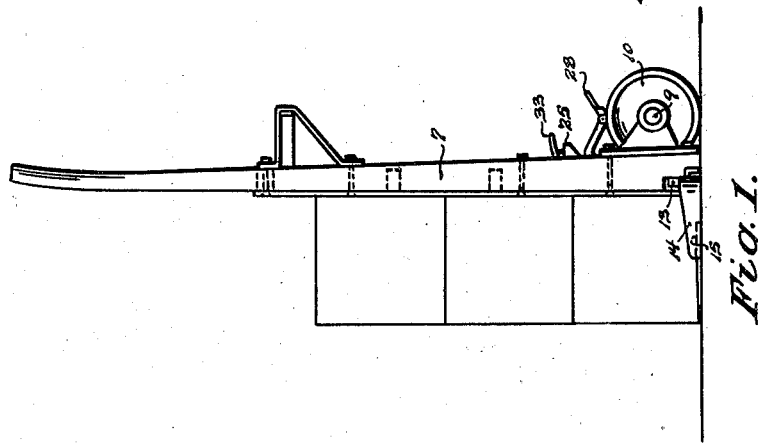
INVENTOR.
William A. Berg
BY
ATTORNEYS.

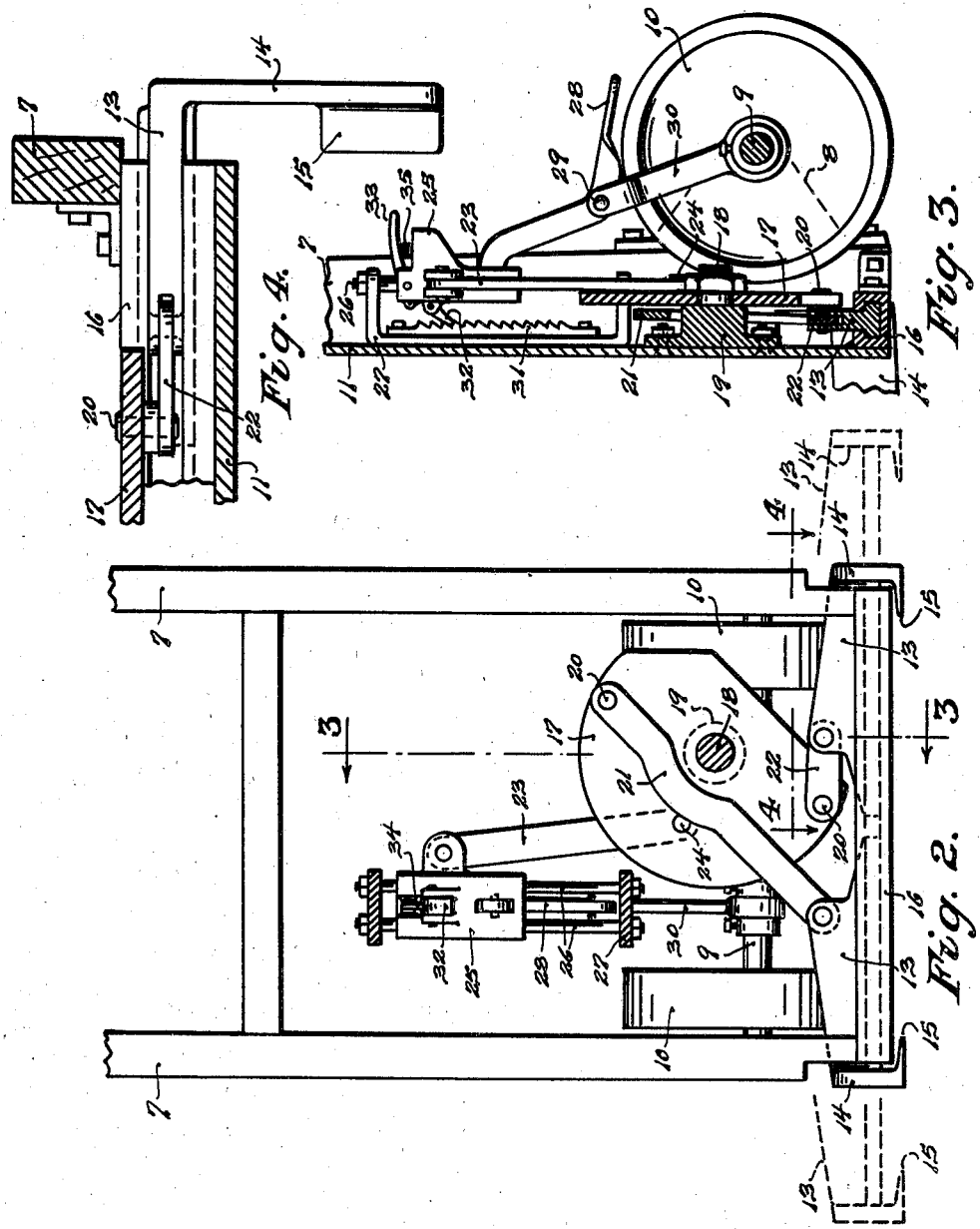

Patented Jan. 11, 1938

2,105,210

UNITED STATES PATENT OFFICE 2,105,210

WAREHOUSE TRUCK

William A. Berg, Yakima, Wash.

Application January 31, 1936, Serial No. 61,656

11 Claims. (Cl. 214—65.5)

This invention relates to warehouse trucks with the object thereof, generally stated, being to provide an improved truck of relatively simple and especially durable construction capable of handling the movement of fruit boxes and the like more, advantageously than has heretofore been possible.

More particularly stated, objects of the present invention are to provide a warehouse truck in which the clamping arms are afforded a materially wider range of movement than has heretofore been possible and to obtain a more effective control of the locking mechanism by which the clamping arms are restrained from expanding beyond positioned clamping points.

The foregoing, together with further and still more particular objects and advantages, will become apparent in the course of the following detailed description and claims, the invention consisting in the novel construction, adaptation, and combination of parts hereinafter described and claimed.

In the drawings:

Figure 1 is a side elevational view indicating the truck as the same is applied in tilting a plurality of fruit boxes preparatory to moving the same.

Fig. 2 is an enlarged detail front elevation thereof with the box-supporting floor removed to expose the operating mechanism, full and dotted lines indicating the contracted and extended positions of the jaws.

Fig. 3 is a detail longitudinal vertical section taken on the line 3—3 of Fig. 2.

Fig. 4 is an enlarged detail horizontal section taken on the line 4—4 of Fig. 2.

Fig. 5 is an enlarged detail longitudinal vertical section through the thrust block which acts to control the position of the clamping arms, the section being taken on the median line of the block; and Fig. 6 is a detail transverse vertical section on line 6—6 of Fig. 5.

The truck illustrated employs a frame including laterally spaced longitudinal members 7, the upper ends of which constitute handles for wheeling the truck and the lower ends receiving brackets 8 which are formed to provide bearings for a transverse axle 9, the truck wheels 10 being suitably mounted on the axle to dispose the same in spaced relation. Overlying the upper edge of the frame members 7 and extending between the same is a boltably connected plate 11 which operates as a floor for the boxes.

According to the present invention, the clamping arms are formed to a relative L-shape in plan configuration to provide transversely disposed slide arms 13 which project forwardly at outer ends of the same in shank elements 14, said shank elements terminating in downwardly off-set fingers 15 which project inwardly. Designed to effect a wedge action as the same are forced under a pile of boxes, the fingers act to tilt the boxes rearwardly against the floor of the truck. The slide arms 13 I form to a relative T-shape in cross-section and provided as a track therefor is a channeled bar 16 extending the width of the truck and boltably or otherwise rigidly secured at the lower end of the latter. To receive said bar 16, the frame members 7 are suitably notched and, above the bar in the plane of the slide arms, provide openings accommodating extension of the arms.

While prior truck constructions have utilized numerous arrangements for regulating the spread of the clamping arms, substantially all of such mechanisms have constituted a toggle structure, the particular disadvantages of which are an extremely limited spread where effective leverages may be obtained. Prior truck arrangements are further objectionable in that, so far as I am aware, the mechanisms employed to lock the arms against box-influenced spreading have required hand release and where this character of release is employed with a foot-operated pedal for spreading the arms, breakage frequently occurs from a tendency of operators to apply foot pressure in advance of hand release.

In overcoming the above objections, I provide a sector arrangement in which a disc member 17 is mounted above the sliding arms 13, a longitudinally disposed horizontal shaft 18 operating as an axis therefor with the shaft being formed as a stud extension from a block 19 boltably secured to the underside of the floor plate 11. Provided at relative diametrically opposite sides of said disc member are wrist pins 20 for pivotally receiving connecting arms 21 and 22 which, at opposite ends, engage the inner termini of the respective slide arms 13. As indicated, each of said connecting arms cross the vertical plane of the disc axis when disposed in fully retracted positions with the wrist pins being located such that the movement of the same is relatively horizontal whereby to obtain a substantially constant leverage through the range of movement of the clamping arms. For operating the disc member, a power arm 23 engages a wrist pin 24 with the driven end of the arm being engaged by a thrust block 25, said thrust block being slidably mounted on vertical rods 26 supported by a rigid frame member 27 with manual elevation of the same being afforded through depression of a foot lever 28 fulcrumed, at 29, to a swinging link 30 carried by the truck axle. To prevent the thrust block from moving downwardly following depression of said foot lever, I provide a rack 31 the teeth of which operate to receive a pawl 32 pivotally carried by the block 25 and in automatically disengaging said pawl in response to and to accommodate manual depression of the thrust block, a foot pedal 33 is pivotally carried by the block at the upper end of the same and engaged by a link 34 with the pawl. Opposing said pawl release and acting to influence the pawl into engagement with the rack teeth is a spring 35.

The operation should be clear from the foregoing, it being my intention that the invention be limited only within the scope of the hereto annexed claims.

What I claim, is:—

1. In a warehouse truck, in combination with a wheeled vehicle of the character described, and a pair of opposing clamping arms supported therepair by for span-regulating movements transversely of the vehicle, rotary means, coupling means connecting said rotary means with the clamping arms for expanding the clamping arms in response to movement of the rotary means in one direction of rotation and for retracting the clamping arms in response to movement in the opposite direction of rotation, means for actuating said rotary means in selective directive rotations, means by which the arms are automatically locked in selected span-regulating positions, said automatically operated locking means permitting free contraction movement of the arms only, and means pansion movement of the arms only, and means acting to release said locking means simultaneously with the operation of said means by which the arms are expanded.

2. The structure as defined in claim 1 wherein said clamping arms are slidable in a rectilineal plane, said connecting means comprising wrist pins carried by the rotary means in off-set relation to the axis of rotation of the same, and connecting arms between said wrist pins and the clamping arms for linking the same together.

3. In a warehouse truck, in combination with a wheeled vehicle of the character described, and a pair of opposing box-clamping arms supported thereby for contraction and expansion movements transversely of the vehicle, rotary control means having crank connection with the clamping arms, foot-operated pedals actuated independently for transmitting opposite directive rotations to the rotary means in selectively contracting and expanding the arms, and pedal-released lock mechanism for securing the arms in adjusted positions.

4. In a warehouse truck of the character described, the combination of a pair of opposing box-clamping members supported for movement transversely of the truck whereby to expand and contract the members, a pair of foot-actuated devices having operative connection with the clamping members and actuated independently to contract and expand the clamping members, and means for locking the clamping members in selected contracted positions against box-influenced expansion movement only, said foot-actuated device for expanding the clamping members being provided with means for releasing the locking means simultaneously with foot-actuation expansion movement.

5. In a warehouse truck, in combination with a wheeled vehicle of the character described, a pair of opposing box-clamping arms provided with extensions therefrom supported by the vehicle for transverse sliding movement, power-transmitting means connected with said extensions for actuating the same inwardly and outwardly as respects the vehicle, power-applying means therefor comprising a pair of foot-actuated pedals operated independently to respectively effect said outward and inward movement, means operating to lock said sliding extensions of the clamping arms against box-influenced outward movement only, following the actuation of the arms to a selected clamping position, and means operating automatically under the influence of pedal-actuated outward movement of the sliding extensions for releasing said locking means.

6. In a warehouse truck, in combination with a wheeled vehicle of the character described having at its lower end a track-forming channel of an inverted-T form extending the approximate width of the vehicle, and a pair of opposing box-clamping members of relative L-shaped plan configurations one arm of which is of an inverted-T cross sectional form for tracking engagement in the channel, the other arm of the respective members projecting forwardly from opposite sides of the vehicle and providing a terminal finger adapted to engage under the lateral edges of the boxes, means connected with the tracking arms of the clamping members for collectively actuating the arms outwardly and inwardly, a pair of foot pedals operatively connected with said means and operating independently to respectively move the arms outwardly and inwardly, pawl-and-rack mechanism acting to lock said arms against box-influenced outward movement beyond a selected clamping position, and means operating automatically in response to pedal-actuated outward movement of the sliding arms for disengaging the pawl from the teeth of the rack.

7. In a warehouse truck, a wheeled vehicle of the character described having at its lower end a track-forming channel of an inverted-T form extending the approximate width of the vehicle, a pair of opposing box-clamping members providing slide arms of an inverted-T cross sectional form received for tracking engagement in said channel, the medial webs of said T-members projecting through the throat of the T-channel, and means carried by the truck and operatively engaging said webs for collectively actuating said sliding arms outwardly and inwardly in the channel.

8. In a warehouse truck, in combination with a wheeled vehicle of the character described having at its lower end a track-forming open-end channel of an inverted-T form, a pair of opposing box-clamping members of relative L-shaped plan configuration of which one arm of each of the same is of an inverted-T cross sectional form, said T-shaped arms of the members being adapted for introduction to the channel to locate the other arms of the same at opposite sides of the vehicle to project forwardly therefrom for clamping the box therebetween, and means carried by the vehicle for imparting collective movement to the tracking arms of said clamping members outwardly and inwardly of the channel, said means comprising a rotative disc member, wrist pins carried thereby at relatively diametrically opposite sides of the disc member, connecting arms linking the wrist pins with inner ends of the tracking arms, a vertically movable thrust block, connection between said thrust block and the disc member for operating the disc member in converse directions of rotation responsive to the relative directions of movement of the thrust block, a rack bar, a pawl carried by the thrust block for locking the thrust block against movement in one direction of reciprocatory travel, a fulcrumed foot lever having connection with the thrust block for actuating the thrust block in the opposite direction of its reciprocatory travel, said lever-influenced travel of the thrust block actuating the disc member to force the tracking arms inwardly, and foot-actuated means for simultaneously disengaging said pawl from the teeth of the rack and actuating the disc member to force the tracking arms outwardly.

9. The structure as defined in claim 8 wherein the travel of the wrist pins is in an arc passing through the vertical plane of the disc axis and in which the opposite extremes of the arcuate movement lie approximately equidistant from said vertical plane whereby to obtain relatively uniform leverage upon the tracking arms throughout the range of movement of the latter.

10. In a warehouse truck, in combination with a truck frame, and a pair of opposing clamping jaws slidably supported for movement toward and from one another, a member slidably supported for movement longitudinally of the frame and a power-transmitting member common to each of the jaws and operated by said slide member for regulating the span of the jaws, and means by which said slide member is actuated longitudinally of the frame comprising a pedal-operated toggle structure, said toggle structure consisting in companion upper and lower arms the upper of which is coupled to the slide member and provided at its opposite end with an integral pedal and the lower of which is fulcrumed at its lower end about a fixed pivot and at its upper end pivotally connected to the pedal-forming arm at the approximate mid-length of the latter.

11. A warehouse truck comprising, in combination, a pair of opposing clamping arms supported for span-regulating expansion and contraction movements from and toward each other in rectilineal planes, mechanism for effecting said movements comprising a pivotally mounted means common to each of the arms and having independent crank connection therewith, and manually-controlled means slidably supported for movement in a rectilineal plane acting to transmit movement to the pivotally mounted means for operating the cranks to regulate said clamping arms.

WILLIAM A. BERG.